United States Patent [19]

Tsubota et al.

[11] Patent Number: 5,526,132
[45] Date of Patent: Jun. 11, 1996

[54] IMAGE EDITING DEVICE WITH SPECIAL EFFECTS USING A RECORDING MEDIUM IN WHICH TWO-CHANNEL REPRODUCTION AND SINGLE-CHANNEL RECORDING ARE SIMULTANEOUSLY POSSIBLE

[75] Inventors: Rumi Tsubota, Hirakata; Kazuo Kajimoto, Neyagawa, both of Japan

[73] Assignee: Matsushita Electric Industrial Co., Ltd., Osaka, Japan

[21] Appl. No.: 156,809

[22] Filed: Nov. 22, 1993

[30] Foreign Application Priority Data

Nov. 27, 1992 [JP] Japan ................................. 4-318199

[51] Int. Cl.⁶ .............................. H04N 5/76; G11B 27/02
[52] U.S. Cl. .............................................. 358/335; 360/13
[58] Field of Search .................................... 358/311, 335, 358/310, 342; 360/13, 14.1, 14.2, 14.3

[56] References Cited

U.S. PATENT DOCUMENTS

| | | |
|---|---|---|
| 4,717,971 | 1/1988 | Sawyer . |
| 4,724,491 | 2/1988 | Lambert . |
| 4,746,994 | 5/1988 | Ettlinger . |
| 4,797,836 | 1/1989 | Witek et al. . |
| 4,991,013 | 2/1991 | Kobayashi . |
| 5,051,927 | 9/1991 | Tada et al. . |
| 5,060,087 | 10/1991 | Nishijima et al. ........... 360/14.1 |
| 5,182,677 | 1/1993 | Kizu et al. . |
| 5,199,102 | 3/1993 | Sakuragi . |
| 5,305,113 | 4/1994 | Iwamura et al. .............. 358/312 |

FOREIGN PATENT DOCUMENTS

| | | |
|---|---|---|
| 0440408 | 1/1991 | European Pat. Off. . |
| 0476985 | 9/1991 | European Pat. Off. . |
| 4121315 | 6/1991 | Germany . |
| WO87/07108 | 11/1987 | WIPO . |

Primary Examiner—Thai O. Tran
Assistant Examiner—Robert Chevalier
Attorney, Agent, or Firm—Price, Gess & Ubell

[57] ABSTRACT

The present invention provides an inexpensive video editing system capable of combining three or more shots simultaneously, and a time-saving method thereof. The video editing system comprises a video storage device for storing a video including a plurality of shots, having a readout unit capable of reading out two shots simultaneously; a shot-reproduce information storage device for storing information as to a shot-readout sequence, a video effect device for combining two shots simultaneously, and a control device for detecting a range of frames where three or more shots to be simultaneously reproduced by referring to the shot-reproduce information, reading out two shots included in the range from the video storage device, combining the two shots at the video effect device, storing a resulting combined shot into the video storage unit, and reading out the combined shot and one of remaining shots in the range from the video storage unit to combine the combined shot and the one of remaining shots at the video effect device, the shot-combining of the combined shot and the remaining shot being repeated until there exists a single resulting combined shot in the range.

26 Claims, 12 Drawing Sheets

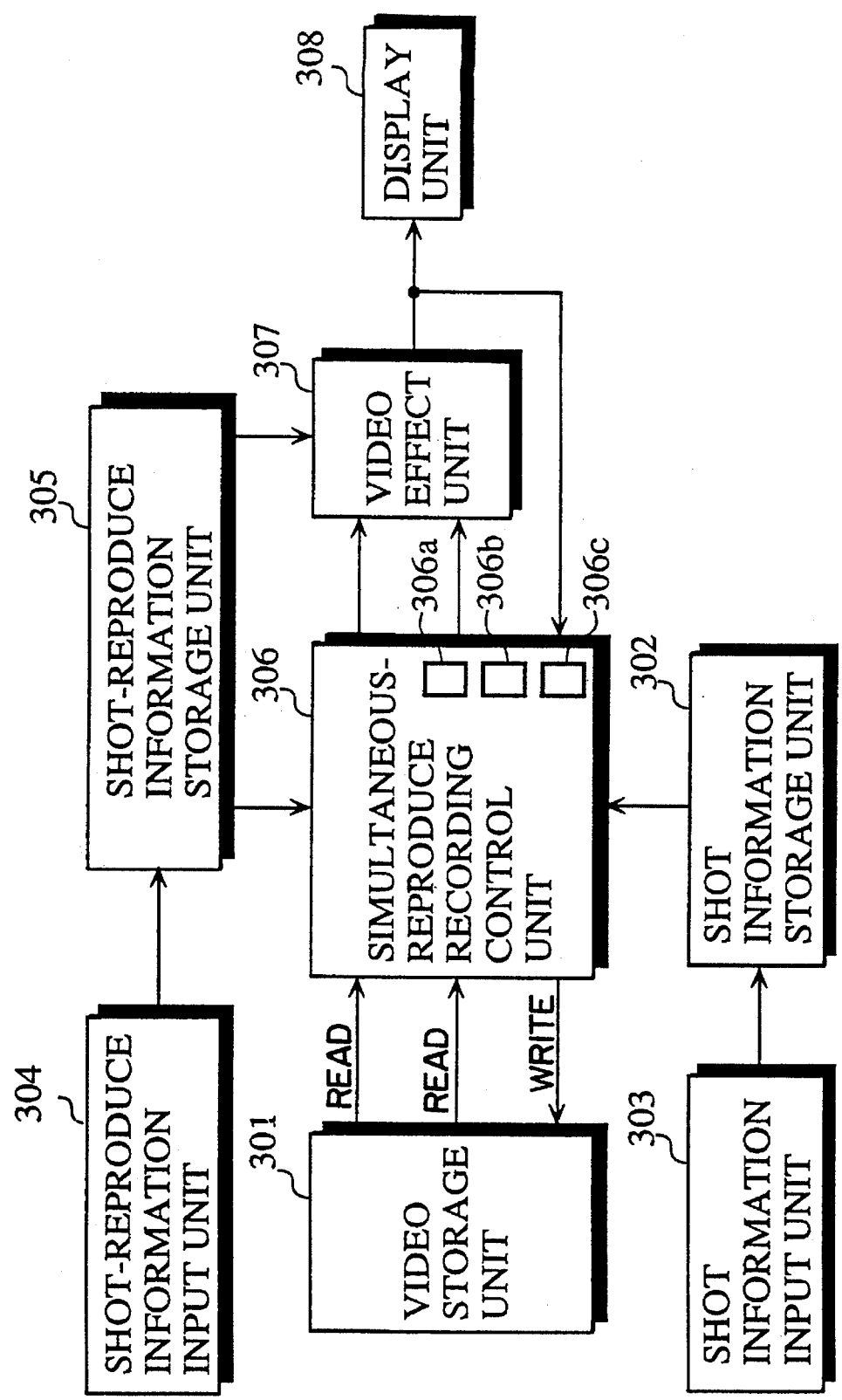

Fig.5 (1)

| SHOT A | SHOT C | SHOT B | SHOT E | SHOT D |
|---|---|---|---|---|

100 250  900 1100 1300  1550  2500  2700 3000 3200

M

↓ COMBINE OVERLAPPED PORTION OF SHOT A AND SHOT B TO PRODUCE SHOT F. RECORD SHOT F.

Fig.5 (2)

| SHOT A1 | SHOT C | SHOT B1 | SHOT E | SHOT D | SHOT F |
|---|---|---|---|---|---|

100 199  900 1100  1351  1550  2500  2700 3000 3200  5000 5050

↓ DIVIDE SHOT C INTO SHOT C1 · SHOT C2.

Fig.5 (3)

| SHOT A1 | SHOT C1 | SHOT C2 | SHOT B1 | SHOT E | SHOT D | SHOT F |
|---|---|---|---|---|---|---|

100 199  900 1000 1001 1100  1351  1550  2500  2700 3000 3200  5000 5050

Fig.6 (1)
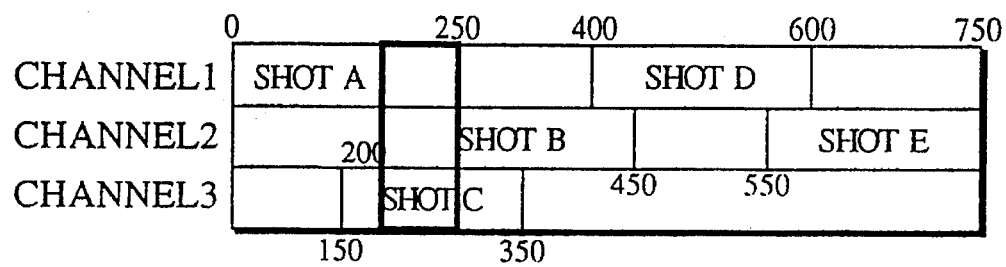
COMBINE SHOTS ASSIGNED TO CHANNELS 1,2 TO PRODUCE SHOT F WHERE 3 SHOTS EXIST.
Fig.6 (2)
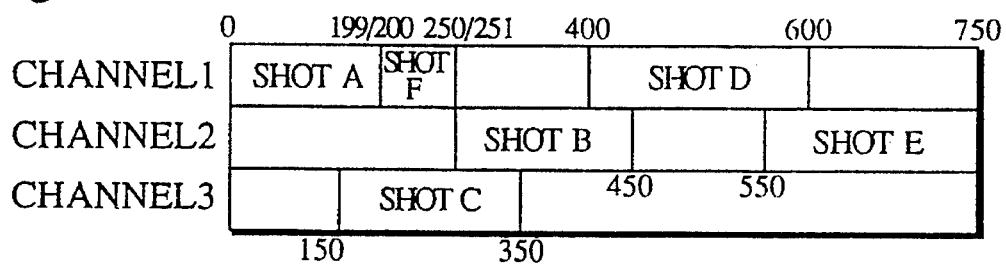
DIVIDE SHOT C AND ASSIGN CHANNELS 1,2.
Fig.6 (3)
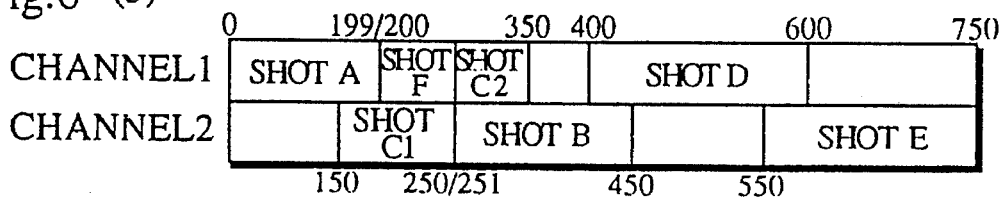

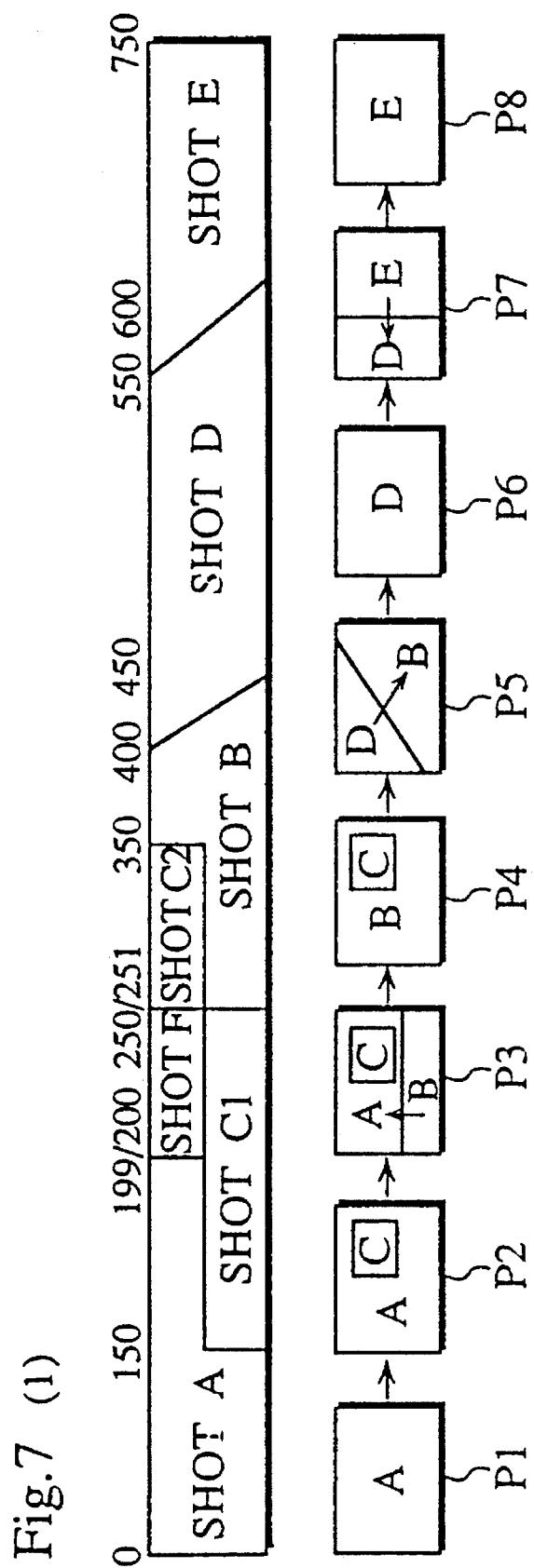

IMAGE EDITING DEVICE WITH SPECIAL EFFECTS USING A RECORDING MEDIUM IN WHICH TWO-CHANNEL REPRODUCTION AND SINGLE-CHANNEL RECORDING ARE SIMULTANEOUSLY POSSIBLE

BACKGROUND OF THE INVENTION (1) Field of the Invention

The present invention relates to a video editing system for editing videos, and to a method thereof.

(2) Description of the Related Art

In a known editing system, editing is performed, for example, in such a way that desired shots are selected from an original source, that is, one roll of video tape including pictures taken by a video camera etc., and dubbed in a master tape.

In such a case, a transitional technique such as wipes or dissolves is applied to a joint between one shot and another on the master tape to further improve a vide effect. The transitional techniques is a technique to gradually replace one shot with a following one continuing in time. With "Wipes", a preceding SHOT A is partly broken away and a following SHOT B is projected in the broken-away part, so that the SHOT A is gradually replaced with the SHOT B as the former fades out while the latter fades in. Whereas with "Dissolves", the picture elements of the preceding SHOT A and those of the following SHOT B in the same locations are composed at a specified rate, and the former is gradually replaced with the latter as the rate changes.

To effect the time-series transition on videos with wipes or dissolves, a technique is required such that combines the SHOT A and the SHOT B by reproducing them in respective channels or reading them out from respective storage units while they are being recorded on a master tape.

On the other hand, the need for effecting the transitional technique to a combined video, or so-called "Picture-in-picture", has been increasing in recent years. This means the video editing system must combine three or more shots simultaneously. Although, systems can be constructed for combining three or more shots simultaneously on real time, it complicates the hardware thereof and costs too much for practical use. Also, such systems combine only a fixed number of shots, making it impossible to operate flexibly where three shots are to be combined in one case, and four shots or five shots in other cases.

To avoid this problem, several techniques have been proposed for combining three or more shots by using an inexpensive conventional video effect unit which is originally designed to combine only two shots simultaneously.

In one of such techniques, 2-shot-combining is repeated. More precisely, assuming that three shots are combined simultaneously, two shots are initially combined by the video effect unit and recorded in a tape which is used as a new original source; another shot is combined with the firstly combined shot on the tape while it is reproduced; and the secondly combined shot is recorded on a master tape.

According to this technique, three shots can be combined by using the video effect unit twice, and four shots for three times. However, each combined shot must be recorded on a tape, and the tape must be reproduced as a new original source for a following 2-shot-combining. Thus, this technique also poses a problem that the entire process is laborious and undesirably takes a long time.

In another one of such techniques, a plurality of the video effect units are connected to each other. More precisely, a first video effect unit 101 is connected to a second video effect unit 102 as is shown in FIG. 1; two shots are read out simultaneously from respective video storage units 103, 104, and combined at the first video editing unit 101; the firstly combined shot is again combined with another shot read out from another video storage unit 105 at the second video editing unit 102; and the secondly combined shot is displayed at a display unit 106.

However, according to this technique, the number of the video effect units increases as the number of shots increases, and so does the cost of production.

SUMMARY OF THE INVENTION

Accordingly, the present invention has an object to provide a video editing system capable of editing three or more shots easily by using an inexpensive single video effect unit originally designed for combining two shots.

The above object is fulfilled by a video editing system comprising: a video storage device for storing a video including a plurality of shots, having a readout unit capable of reading out two shots simultaneously; a shot-reproduce information storage device for storing information as to a shot-readout sequence; a video effect device for combining two shots simultaneously; and a control device for detecting a range of frames where there exist three or more shots to be reproduced simultaneously by referring to the shot-reproduce information, and reading out two shots included in the range from the video storage device to combine the two shots at the video effect device, storing a resulting combined shot into the video storage unit, reading out the combined shot and one of remaining shots in the range from the video storage unit, combining the combined shot and the one of remaining shots at the video effect device, the shot-combining of the combined shot and the remaining shot being repeated until there exists a single resulting combined shot in the range.

The video storage device may include a writing unit for writing the combined shot produced by the video effect device into a storage area in the video storage device, and the control device may use the writing unit to write the combined shot into the storage area in the video storage device.

The video editing system may further comprise a shot information storage device for storing information representing a correspondence between each shot and the storage area in the video storage device, wherein the control device includes a shot information updating unit for updating the shot information each time the control device writes a combined shot into the video storage device by means of the writing device.

The video storage device may include a high-speed hard disk having a high-speed reading/writing head, three FIFOs each having a capacity comparable to at least one shot, and switch device for selectively connecting one of the three FIFOs to the head under a control of the control device, each of two of the three FIFOs storing a shot readout from the hard disk, while the remaining FIFO storing the combined shot to be written into the hard disk.

The high-speed hard disk may include a first storage area for storing at least one non-combined shot and a second storage area for storing at least one combined shot, and the control device may write the combined shot into the second storage area in the video storage device by means of the writing unit.

The head may read out and write a shot block by block, each block including a plurality of frames, and the control device may read out two shots from the two FIFOs frame by frame simultaneously and write the combined shot into the remaining FIFO frame by frame.

The 2-shot-combining at the video effect device may include transition by wipes and dissolves, and formation of a shot contained in another shot.

The video editing system may further comprise: a compressing device for compressing the combined shot from the video effect device by a certain compressing method to store a resulting compressed, combined shot into the video storage device; and an expanding device for expanding a compressed shot read out from the video storage device by a certain expanding method to supply a resulting shot to the video effect device.

The compressing device and the expanding device may use a JPEG method as the certain compressing method and the certain expanding method, respectively.

The video storage device may include a writing unit for writing the compressed, combined shot produced by the video effect device into a storage area in the video storage device, and the control device may use the writing unit to write the compressed, combined shot into the storage area in the video storage device.

The video editing system may further comprise a shot information storage device for storing information representing a correspondence between each compressed shot and the storage area in the video storage device, wherein the control device includes a shot information updating unit for updating the shot information each time the control device writes a compressed, combined shot into the video storage device by means of the writing device.

The video storage device may include a high-speed hard disk having a high-speed reading/writing head, three FIFOs each having a capacity comparable to at least one compressed shot, and a switch device for selectively connecting one of the three FIFOs to the head under a control of the control device, each of two of the three FIFOs storing a compressed shot readout from the hard disk, while the remaining FIFO storing the compressed, combined shot to be written into the hard disk.

The high-speed hard disk may include a first storage area for storing at least one compressed, non-combined shot, and a second storage area for storing at least one compressed, combined shot, and the control device may write the compressed, combined shot into the second storage area in the video storage device by means of the writing unit.

The head may read out and write a compressed shot block by block, each block including a plurality of frames, and the control device may read reads out two compressed shots from the two FIFOs frame by frame simultaneously and write the combined shot into the remaining FIFO frame by frame.

The video editing system may further comprise a shot information storage device for storing information representing a correspondence between each shot and the storage area in the video storage device, wherein the control device includes a shot information updating unit for updating the shot information each time the control device writes a combined shot into the video storage device by means of the writing device.

The above object is also fulfilled by a video editing system comprising: a video storage device for storing a video including a plurality of shots, having a high-speed readout/writing unit with two channels capable of reading two shots simultaneously by using the two channels; a shot-reproduce information storage device for storing information as to a shot-readout sequence; a video effect device for combining two shots simultaneously; a channel assigning device for creating a plurality of virtual channels in a corresponding number to a maximum number of shots to be reproduced simultaneously by referring to the shot-reproduce information to assign one of the virtual channels to each shot; a detecting device for detecting a range of frames where there exist three or more shots to be reproduced simultaneously by referring to the shot-reproduce information; a control device for reading out two shots contained in the range of frames from the video storage device simultaneously, combining the two shots at the video effect device, writing a resulting combined shot into the video storage device, and reading out the combined shot and one of remaining shots contained in the range from the video storage device to combine the combined shot with the one of remaining shots at the video effect device, the shot-combining of the combined shot and the remaining shot being repeated until the number of shots to be reproduced simultaneously has two or less; a channel changing device for imposing a lastly remaining shot without being combined and being assigned with the virtual channel into one of one and two the channels of the reading/writing unit when the number of shots for simultaneous reproduction has two or less; a shot-reproduce information updating device for updating the shot-reproduce information each time the video effect device combines two shots into a new shot, and updating the shot-reproduce information to obtain a last shot-reproduce information when the remaining shot is imposed onto one of one and two the channels by the channel changing device; and a final-combining executing device for reading out two shots from the channels respectively after the imposition, and combining the two shots at the video effect device to output a resulting combined shot as a result of editing.

The video editing system may further comprise a shot information storage device for storing information representing a correspondence between each shot and the storage area in the video storage device, and a shot information updating unit for updating the shot information each time the control device writes a resulting combined shot into the video storage device.

The video storage device may include a high-speed hard disk having a high-speed reading/writing head, three FIFOs each having a capacity comparable to at least one shot, and a switch device for selectively connecting one of the three FIFOs to the head under a control of the control device, each of two of the three FIFOs storing a shot readout from the hard disk, while the remaining FIFO storing the combined shot to be written into the hard disk.

The high-speed hard disk may include a first storage area for storing at least one non-combined shot, and a second storage area for storing at least one combined shot, and the control device may write the combined shot into the second storage area in the video storage device by means of the writing unit.

The video editing system may further comprise: a compressing device for compressing the combined shot from the video effect device by a certain compressing method to store a resulting compressed combined shot into the video storage device, and an expanding device for expanding a compressed shot read out from the video storage device by a certain expanding method to supply a resulting shot to the video effect device.

The compressing device and the expanding device may use a JPEG method as the certain compressing method and the certain expanding method, respectively.

The video storage device may include a writing unit for writing the compressed, combined shot produced by the video effect device into a storage area in the video storage device, and the control device may use the writing unit to write the compressed, combined shot into the storage area in the video storage device.

The video editing system may further comprise a shot information storage device for storing information representing a correspondence between each compressed shot and the storage area in the video storage device, wherein the control device includes a shot information updating unit for updating the shot information each time the control device writes a compressed, combined shot into the video storage device by means of the writing device.

The video storage device may include a high-speed hard disk having a high-speed reading/writing head, three FIFOs each having a capacity comparable to at least one compressed shot, and a switch device for selectively connecting one of the three FIFOs to the head under a control of the control device, each of two of the three FIFOs storing a compressed shot readout from the hard disk, while the remaining FIFO storing the compressed, combined shot to be written into the hard disk.

The high-speed hard disk may include a first storage area for storing at least one compressed, non-combined shot, and a second storage area for storing at least one compressed, combined shot, and the control device may write the compressed, combined shot into the second storage area in the video storage device by means of the writing unit.

The head may read out and write a compressed shot block by block, each block including a plurality of frames, and the control device may read reads out two compressed shots from the two FIFOs frame by frame simultaneously and write the combined shot into the remaining FIFO frame by frame.

The video storage device may include a high-speed hard disk having a high-speed reading/writing head, three FIFOs each having a capacity comparable to at least one compressed shot, and a switch device for selectively connecting one of the three FIFOs to the head under a control of the control device, each of two of the three FIFOs storing a compressed shot readout from the hard disk, while the remaining FIFO storing the compressed, combined shot to be written into the hard disk.

The high-speed hard disk may include a first storage area for storing at least one compressed, non-combined shot, and a second storage area for storing at least one compressed, combined shot, and the control device may write the compressed, combined shot into the second storage area in the video storage device by means of the writing unit.

The head may read out and write a compressed shot block by block, each block including a plurality of frames, and the control device may read reads out two compressed shots from the two FIFOs frame by frame simultaneously and write the combined shot into the remaining FIFO frame by frame The present invention has another object to provide a time-saving method of editing videos.

The above object is fulfilled by a method of video editing in a video editing system comprising: a video storage device for storing a video of a plurality of shots having a readout/writing unit with two channels for reading out two shots simultaneously by using the two channels, a video effect device for effecting two-shot-combining including transition by wipes and dissolve, and formation of a sub-shot contained in another shot, a shot information storage device for storing information representing a correspondence between each shot and a storage area in the video storage device, a shot-reproduce information storage device for storing information as to a shot-readout sequence, the information including a range of frames where there exist three or more shots to be reproduced simultaneously. The method for editing a video comprising the steps of:(1) detecting the range of frames where there exist three or more shots to be reproduced simultaneously by referring to the shot-reproduce information;.(2) reading out two shots simultaneously contained in the range from the video storage device by referring the shot information;(3) combining the two shots at the video effect device to write a resulting combined shot into the video storage device;(4) reading out one of remaining shots in the range and the combined shot simultaneously from the video storage device to combine the combined shot and the one of remaining shot at the video effect device; and (5) repeating the third and fourth steps until there exists up to two shots to be reproduced simultaneously at all the frames, and subsequently reading out all the shots in a frame sequence from the video storage unit to combine them at the video effect device for outputting a result.

The third step may include the sub-steps of: updating the shot-reproduce information each time the video effect device combines two shots; and adding information as to the storage area where the combine shot is stored in the video storage device to the shot information.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings:

FIG. 3 is a block diagram showing one embodiment of a video editing system of the present invention;

FIGS. 5(1) to 5(3) are schematic views of a transition of the contents in a high-speed hard disk before and during video editing;

FIGS. 6(1) to 6(3) are schematic views of shot-reproduce information;

FIG. 7(1) is a view showing how all the shots are edited in a time series;

FIG. 7(2) is a view showing how the shots are combined at an arbitrary time in relation to FIG. 7(1);

DESCRIPTION OF PREFERRED EMBODIMENTS

Figure 2:
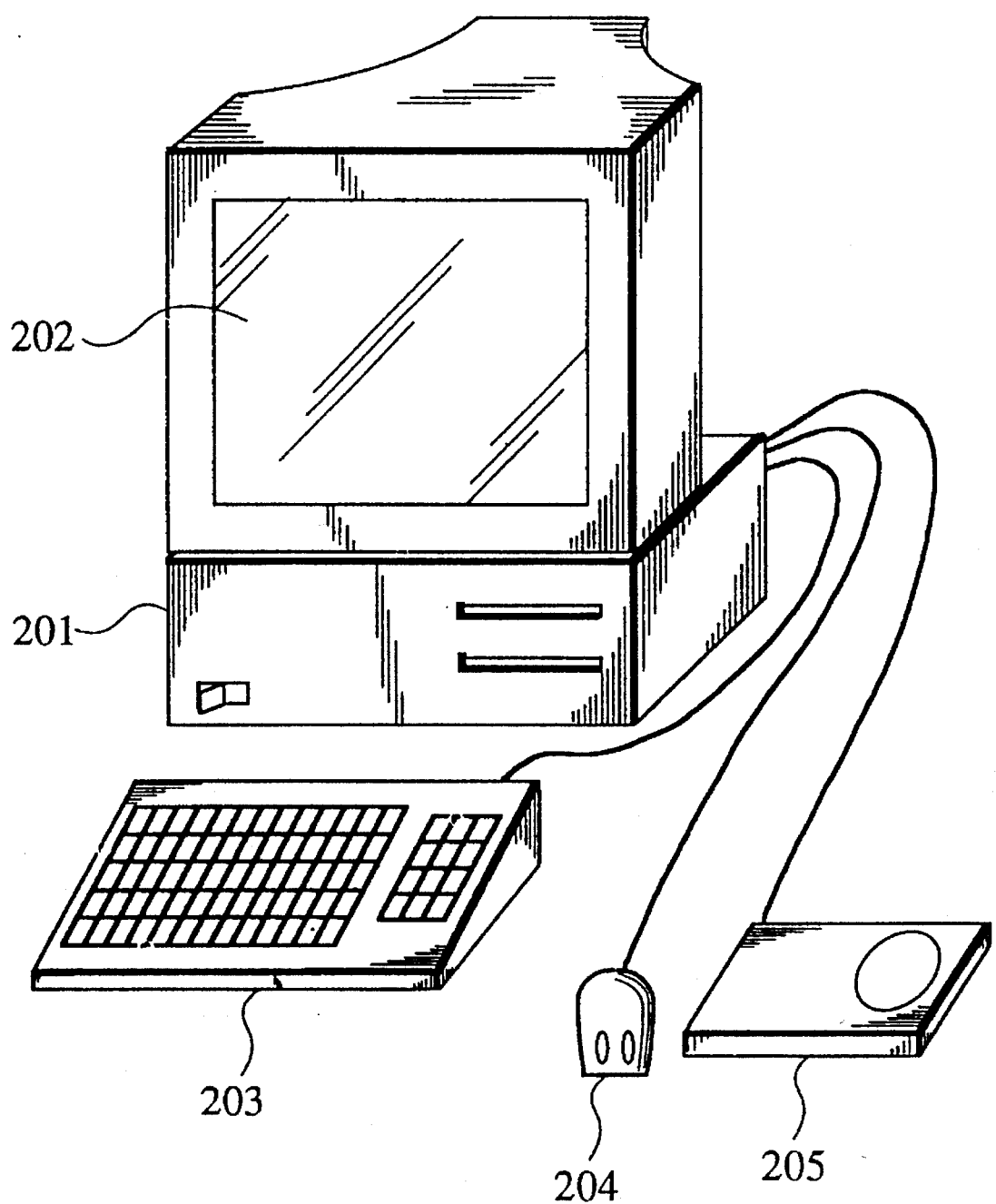
FIG. 2 is a view showing the external appearance of a video editing system of the present invention.

FIG. 2 provides the external appearance of a video editing system in accordance with one embodiment of the present invention. The video editing system comprises a main control unit 201, a CRT 202, a key board 203, a mouse 204, and a jog dial 205 used for video operation.

FIG. 3 is a block diagram showing the construction of the video editing system that includes a video storage unit 301, a shot information storage unit 302, a shot information input unit 303, a shot-reproduce information input unit 304, a shot-reproduce information storage unit 305, a simultaneous-reproduce recording control unit 306, a video effect unit 307, and a display unit 308.

Figure 4:
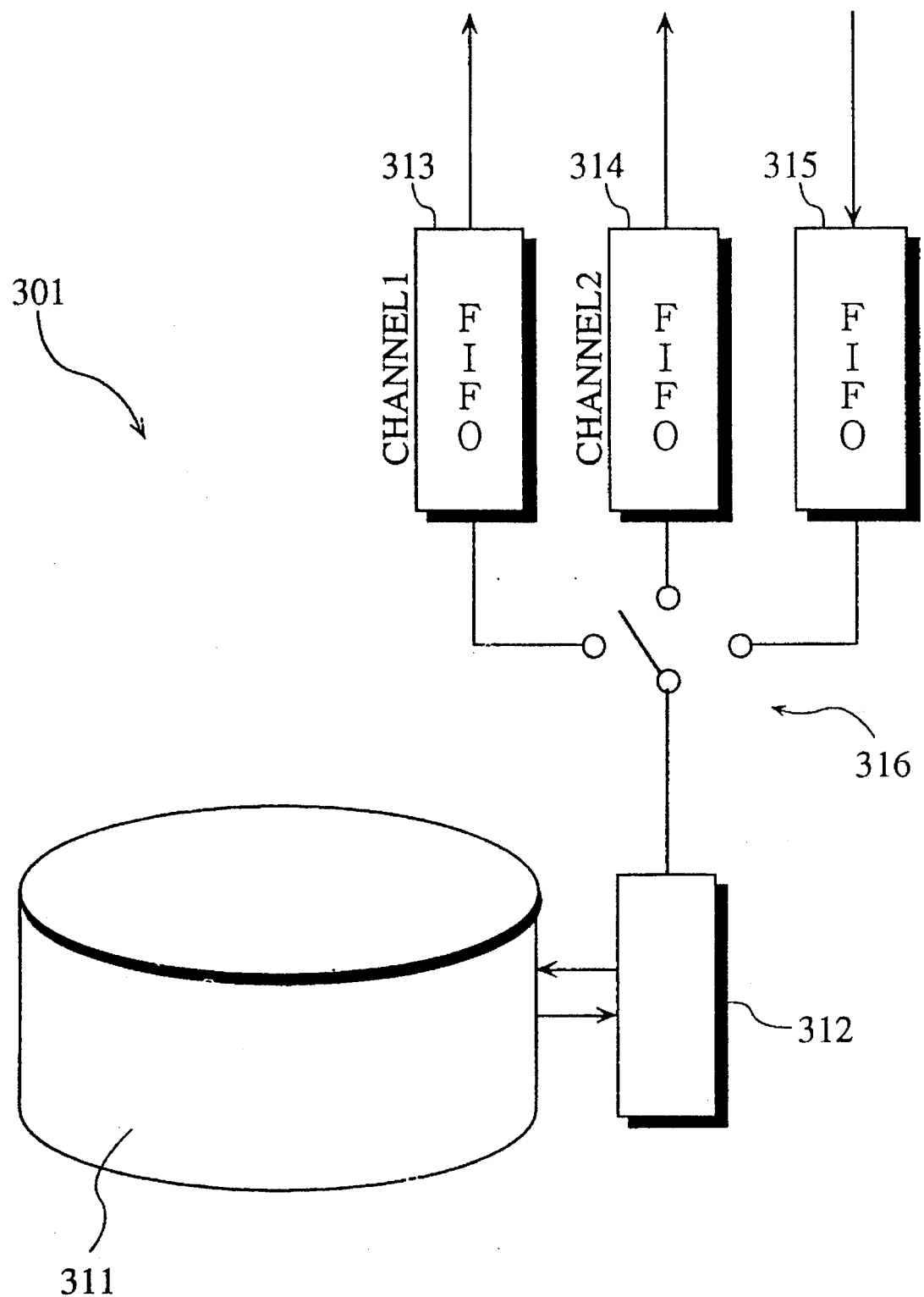
FIG. 4 is a view depicting the construction of a video storage unit.

The video storage unit 301, as is shown in FIG. 4, comprises a high-speed disk medium 311 for storing a digitalized video including both edited and non-edited (hereinafter, simply referred to as the video), a high-speed head unit 312 for reading out and writing the video, two FIFOs 313, 314 each for storing at least one shot in the video read out from the high-speed disk medium 311, an FIFO 315 for storing at least one combined shot in the video to be written into the high-speed disk medium 311, and a switch unit 316 for selectively connecting one of the three FIFOs 313 through 315 to the head unit 312 under the control of the simultaneous-reproduce recording control unit 306. Note that the shots in the FIFOs 313, 314 are read out via CHANNEL 1 and CHANNEL 2, respectively, while the combined shot is written via another channel.

The high-speed disk medium 311 is a memory with a large capacity having an area for storing non-edited videos and an area for storing shots being edited. The non-edited video comprises a great number of frames as does a roll of video tape taken by a video camera, which is hereinafter referred to as the original source. An example of the original source is schematically shown in FIG. 5(1). In the drawing, numerals such as 100, 250, . . . represent serial frame numbers, and SHOT A through E are the shots selected for editing.

Each of FIFOs 313 through 315 has a sufficient capacity to store at least one shot. The head unit 312 operates at a high-speed by reading out and writing by so-called "block transfer": it reads out and writes a shot block by block, each including a plurality of frames. On the other hand, the simultaneous-reproduce recording control unit 306 reads out shots from the FIFOs 313, 314 and stores a combined shot into the FIFO 315 frame by frame at a synchronized timing with a frame cycle. In general, the operation speeds of the head unit 312 and the simultaneous-reproduce recording control unit 306 are predetermined, so that the former writes two shots into the respective FIFOs 313, 314 faster than the latter reads out the two shots simultaneously from the two FIFOs 313, 314.

The shot information storage unit 302 stores shot information as to shots to be read out from the high-speed disk medium 311, and the starting and ending frame numbers of these shots on the original source. For example, the shot information in a case shown in FIG. 5(1), where SHOTS A through E are selected from an original source M, is set forth in TABLE 1-1 below.

The shot information is initially inputted from the shot information input unit 303, and during the editing, it is updated by the simultaneous-reproduce recording control unit 306 each time a combined shot produced by the video effect unit 307 is written into the high-speed disk medium 311. Updated shot information is set forth in TABLE 1-2, 1-3 below, and the method of updating will be described later.

The shot information input unit 303 corresponds to the key board 203 in FIG. 2, and as previously described, it is used to input the initial shot information into the shot information storage unit 302.

TABLE 1-1

| SHOT ID | FRAME No. AT IN | FRAME No. AT OUT |
| --- | --- | --- |
| SHOT A | 100 | 250 |
| SHOT B | 1300 | 1550 |
| SHOT C | 900 | 1100 |
| SHOT D | 3000 | 3200 |
| SHOT E | 2500 | 2700 |

TABLE 1-2

| SHOT ID | FRAME No. AT IN | FRAME No. AT OUT |
| --- | --- | --- |
| SHOT A1 | 100 | 199 |
| SHOT B1 | 1351 | 1550 |
| SHOT C | 900 | 1100 |
| SHOT D | 3000 | 3200 |
| SHOT E | 2500 | 2700 |
| SHOT F | 5000 | 5050 |

TABLE 1-3

| SHOT ID | FRAME No. AT IN | FRAME No. AT OUT |
| --- | --- | --- |
| SHOT A1 | 100 | 199 |
| SHOT B1 | 1351 | 1550 |
| SHOT C1 | 900 | 1000 |
| SHOT C2 | 1001 | 1100 |
| SHOT D | 3000 | 3200 |
| SHOT E | 2500 | 2700 |
| SHOT F | 5000 | 5050 |

The shot-reproduce information input unit 304, which also corresponds to the key board in FIG. 2, is used to input shot-reproduce information as to the sequence of shots, the number of frames in a joint, and transitional conditions.

The shot-reproduce information storage unit 305 stores the shot-reproduce information. Like the shot information, the shot-reproduce information is initially inputted from the shot-reproduce information input unit 304, and during the editing, it is updated by the simultaneous-reproduce recording control unit 306 each time a combined shot from the video effect unit 307 is written into the high-speed disk medium 311.

The initial shot-reproduce information inputted by an operator and updated shot-reproduce information are respectively set forth in TABLES 2-1, 2-2, and 2-3 below. The method of updating will be also described later.

TABLE 2-1

| TIME FRAME No. | CHANNEL | EVENT | OPERATION AT UNIT 307 |
| --- | --- | --- | --- |
| 0 | 1 | REPRODUCING OF SHOT A STARTS | |
| 150 | 3 | REPRODUCING OF SHOT C STARTS | PICTURE-IN-PICTURE STARTS |
| 200 | 2 | REPRODUCING OF SHOT | TRANSITION FROM CHANNEL 1 TO |

TABLE 2-1-continued

| TIME FRAME No. | CHANNEL | EVENT | OPERATION AT UNIT 307 |
|---|---|---|---|
| 250 | 1 | B STARTS REPRODUCING OF SHOT A ENDS | CHANNEL 2 STARTS TRANSITION FROM CHANNEL 1 TO CHANNEL 2 ENDS |
| 350 | 3 | REPRODUCING OF SHOT C ENDS | PICTURE-IN-PICTURE ENDS |
| 400 | 1 | REPRODUCING OF SHOT D STARTS | TRANSITION FROM CHANNEL 2 TO CHANNEL 1 STARTS |
| 450 | 2 | REPRODUCING OF SHOT B ENDS | TRANSITION FROM CHANNEL 2 TO CHANNEL 1 ENDS |
| 550 | 2 | REPRODUCING OF SHOT E STARTS | TRANSITION FROM CHANNEL 1 TO CHANNEL 2 STARTS |
| 600 | 1 | REPRODUCING OF SHOT D ENDS | TRANSITION FROM CHANNEL 1 TO CHANNEL 2 ENDS |
| 750 | 2 | REPRODUCING OF SHOT E ENDS | |

TABLE 2-2

| TIME FRAME No. | CHANNEL | EVENT | OPERATION AT UNIT 307 |
|---|---|---|---|
| 0 | 1 | REPRODUCING OF SHOT A1 STARTS | |
| 150 | 3 | REPRODUCING OF SHOT C STARTS | PICTURE-IN-PICTURE STARTS |
| 199 | 1 | REPRODUCING OF SHOT A1 ENDS | |
| 200 | 1 | REPRODUCING OF SHOT F STARTS | |
| 250 | 1 | REPRODUCING OF SHOT F ENDS | |
| 251 | 2 | REPRODUCING OF SHOT B1 STARTS | |
| 350 | 3 | REPRODUCING OF SHOT C ENDS | PICTURE-IN-PICTURE ENDS |
| 400 | 1 | REPRODUCING OF SHOT D STARTS | TRANSITION FROM CHANNEL 2 TO CHANNEL 1 STARTS |
| 450 | 2 | REPRODUCING OF SHOT B1 ENDS | TRANSITION FROM CHANNEL 2 TO CHANNEL 1 ENDS |
| 550 | 2 | REPRODUCING OF SHOT E STARTS | TRANSITION FROM CHANNEL 1 TO CHANNEL 2 STARTS |
| 600 | 1 | REPRODUCING OF SHOT D ENDS | TRANSITION FROM CHANNEL 1 TO CHANNEL 2 ENDS |
| 750 | 2 | REPRODUCING OF SHOT E ENDS | |

TABLE 2-3

| TIME FRAME No. | CHANNEL | EVENT | OPERATION AT UNIT 306 | OPERATION AT UNIT 307 |
|---|---|---|---|---|
| 0 | 1 | REPRODUCING OF SHOT A1 STARTS | *100TH FRAME IN UNIT 301 IS ACCESSED *BLOCK TRANSFER TO FIFO OF CHANNEL 1 *READOUT FROM FIFO OF CHANNEL 1 TO UNIT 307 STARTS | |
| 150 | 2 | REPRODUCING OF SHOT C1 STARTS | *900TH FRAME IN UNIT 301 IS ACCESSED *BLOCK TRANSFER TO FIFO OF CHANNEL 2 *READOUT FROM FIFO OF CHANNEL 2 TO UNIT 307 STARTS | PICTURE-IN-PICTURE STARTS |
| 199 | 1 | REPRODUCING OF SHOT A1 ENDS | *READOUT FROM FIFO OF CHANNEL 2 TO UNIT 307 ENDS | |
| 200 | 1 | REPRODUCING OF SHOT F STARTS | *5000TH FRAME IN UNIT 301 IS ACCESSED *BLOCK TRANSFER TO FIFO OF CHANNEL 1 *READOUT FROM FIFO OF CHANNEL 1 TO UNIT 307 ENDS | |
| 250 | 1 | REPRODUCING OF SHOT F ENDS | *READOUT FROM FIFO OF CHANNEL 1 TO UNIT 307 ENDS | |
| | 2 | REPRODUCING OF SHOT C1 | *READOUT FROM FIFO OF CHANNEL 2 TO | PICTURE-IN- |

TABLE 2-3-continued

| TIME FRAME No. | CHANNEL | EVENT | OPERATION AT UNIT 306 | OPERATION AT UNIT 307 |
|---|---|---|---|---|
| | | ENDS | UNIT 307 ENDS | PICTURE ENDS |
| 251 | 1 | REPRODUCING OF SHOT C2 STARTS | *1001TH FRAME IN UNIT 301 IS ACCESSED *BLOCK TRANSFER TO FIFO OF CHANNEL 1 *READOUT FROM FIFO OF CHANNEL 1 TO UNIT 307 ENDS | PICTURE-IN-PICTURE STARTS |
| | 2 | REPRODUCING OF SHOT B1 STARTS | *1351ST FRAME IN UNIT 301 IS ACCESSED *BLOCK TRANSFER TO FIFO OF CHANNEL 2 *READOUT FROM FIFO OF CHANNEL 2 TO UNIT 307 ENDS | |
| 350 | 1 | REPRODUCING OF SHOT C2 ENDS | *READOUT FROM FIFO OF CHANNEL 1 TO UNIT 307 ENDS | PICTURE-IN-PICTURE ENDS |
| 400 | 1 | REPRODUCING OF SHOT D STARTS | *3000TH FRAME IN UNIT 301 IS ACCESSED *BLOCK TRANSFER TO FIFO OF CHANNEL 1 *READOUT FROM FIFO OF CHANNEL 1 TO UNIT 307 ENDS | TRANSITION FROM CHANNEL 2 TO CHANNEL 1 |
| 450 | 2 | REPRODUCING OF SHOT B1 ENDS | *READOUT FROM FIFO OF CHANNEL 2 TO UNIT 307 ENDS | TRANSITION FROM CHANNEL 2 TO CHANNEL 1 ENDS |
| 550 | 2 | REPRODUCING OF SHOT E STARTS | *2500TH FRAME IN UNIT 301 IS ACCESSED *BLOCK TRANSFER TO FIFO OF CHANNEL 2 *READOUT FROM FIFO OF CHANNEL 2 TO UNIT 307 ENDS | TRANSITION FROM CHANNEL 1 TO CHANNEL 2 STARTS |
| 600 | 1 | REPRODUCING OF SHOT D ENDS | *READOUT FROM FIFO OF CHANNEL 1 TO UNIT 307 ENDS | TRANSITION FROM CHANNEL 1 TO CHANNEL 2 ENDS |
| 750 | 2 | REPRODUCING OF SHOT E ENDS | *READOUT FROM FIFO OF CHANNEL 2 TO UNIT 307 ENDS | |

The video effect unit 307 is a known device for effecting a transition or picture-in-picture of two videos in accordance with the shot-reproduce information. A model WJ-MX-50 of the Matsushita Electric Company is one of the available devices.

The display unit 308 corresponds to the CRT 202 in FIG. 2, and it displays the result of editing. Note that the display unit 308 is not an essential component of the present invention; it may be replaced with a recording unit that records the result of editing on a master tape.

The simultaneous-reproduce recording control unit 306 plays a key role to edit a video as desired: it reads out a certain two shots from the high-speed disk medium 311 by referring to the shot information from the shot information storage unit 302 and shot-reproduce information from the shot-reproduce information storage unit 305 to combine the two shots at the video effect unit 307; it writes the resulting combined shot into the high-speed disk medium 311 and accordingly updates the shot information and shot-reproduce information; and it repeats the above-described operation as many times as necessary.

Figure 8:
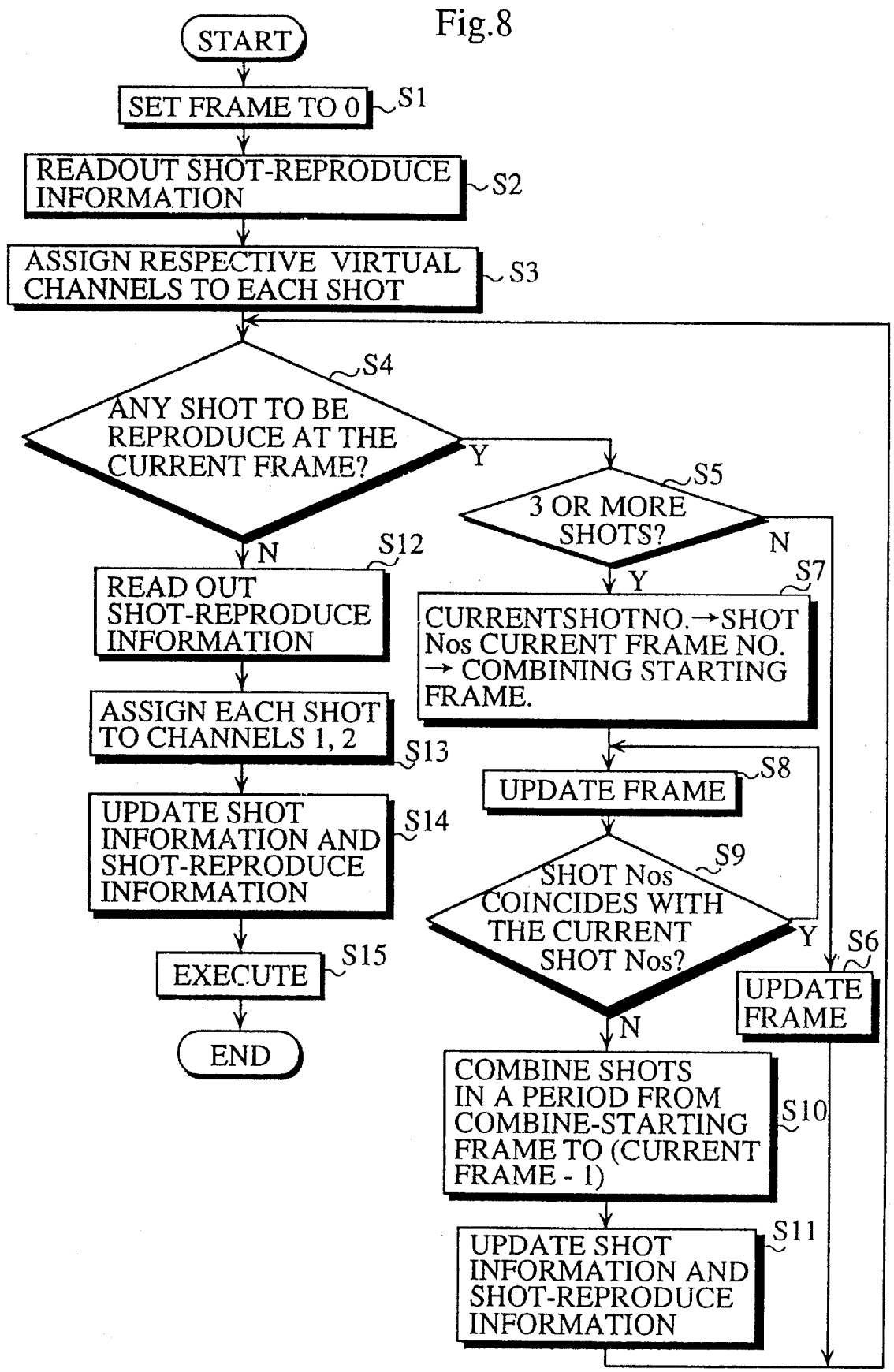
FIGS. 8 to 10 are flowcharts detailing the operation of a simultaneous-reproduce recording control unit.

The operation of the simultaneous-reproduce recording control unit 306 is detailed by the flowcharts in FIGS. 8 to 10, and the explanation thereof will be given in the following. For convenience' sake, the simultaneous-reproduce recording control unit 306 is simply referred to as the control unit 306 hereinafter, and assume that the high-speed disk medium 311 has already stored the original source M shown in FIG. 5(1), the shot information storage unit 302 has stored the initial shot information shown in TABLE 1-1, and the shot-reproduce information storage unit 305 has stored the initial shot-reproduce information shown in TABLE 2-1; although channel numbers have been assigned in TABLE 2-1, no channel numbers are assigned yet at this point.

Given these circumstances, when the operation of the system starts, the control unit 306 sets a frame timer equipped therein to 0(Step 1), and reads out the shot information from the shot information storage unit 302 and the shot-reproduce information from the shot-reproduce information storage unit 305(Step 2).

Subsequently, it detects a maximum number of shots to be reproduced simultaneously by referring to the readout shot-reproduce information, and creates virtual channels in a matching number to assign these virtual channels to each shot contained in the shot-reproduce information(Step 3). Note that the virtual channels do not correspond to the existing CHANNELs 1, 2 and the channel for writing. With respect to shots to be reproduced simultaneously, the same virtual channel will not be assigned, and the virtual channels are assigned according to the following rule: a first virtual channel will be assigned to a shot to be reproduced at the earliest frame, and a second to a shot to which the firstly reproduced shot transits; a last to a shot to be combined as a picture-in-picture. Numerals in the channel column in TABLE 2-1 represent virtual channel numbers assigned in this way.

FIG. 6(1) is a view showing the time-series transition for the shots assigned with respective virtual channels. It is understood from the drawing that three shots—SHOTS A, B and C—are to be reproduced simultaneously from the 200th to 250th frames. A first virtual channel 1 is assigned to the SHOT A as being the one to be reproduced at the earliest frame, and a last virtual channel 3 to the SHOT C as being the picture-in-picture in this case.

Having assigned the virtual channels to all the shots, the control unit 306 detects whether there exists any shot to be reproduced at that instance(Step 4). Immediately after the start of the operation, or at the 0th frame, the control unit 306 detects the SHOT A as the one to be reproduced by referring to the shot-reproduce information. When the control unit 306 detects any shot in Step 4 like in this case, it proceeds to Step 5, where it further detects whether there exist three or more shots for simultaneous reproduction by detecting the number of the virtual channels. Given that there only exist up to two shots during a range of the 0th to 199th frames, the control unit 306 repeats a loop of Step 6, Step 4, Step 5, and Step 6, updating the frame number one by one.

The control unit 306 updates the frame number by incrementing a frame counter 306a equipped therein one by one. Note that the frame numbers referred herein represent the frame numbers at the time of reproduction and are not the same as those on the material M, and that no shots are read out from the video storage unit 301 while the frame number is updated.

When the frame counter 306a counts up to 200, where there exist three shots—the SHOTS A, B, and C—for simultaneous reproduction, the control unit 306 proceeds to Step 5 to Step 7. In Step 7, the control unit 306 stores the total number of shots for simultaneous reproduction at that instance into a shot register 306b equipped therein, while storing the counting value of the frame counter 306a representing the current frame number into a frame register 306c. The control unit 306 updates the frame counter 306a repeatedly until the number in the shot register 306b differs from the total number of shots for simultaneous reproduction(Step 8, Step 9).

Given that there exist three shots up to the 250th frame and two after the 251st frame, the control unit 306 proceeds to Step 10 at the 251st frame, whereby the shots existing up to a frame number found by subtracting 1 from the current counting value of the frame counter 306a(251−1=250) are combined. This step is detailed by the flowchart in FIG. 9 and the explanation thereof will be given in the following.

To begin with, the control unit 306 gives n to the total number of shots in a corresponding range of the frames(the 200th to 250th)(Step 21), reads out shots of two virtual channels having the smallest and the second smallest numbers from the video storage unit 301, and combines the two shots at the video effect unit 307(Step 23). In this case, the control unit 306 stores the resulting combined shot of the SHOT A and SHOT B referred to as a SHOT F into a free space of the video storage unit 301, while assigning the virtual channel 1 thereto(Step 24).

Then, the control unit 306 updates n by subtracting one from the current n(Step 25), and detects whether an updated n has two or less(Step 22). If so, the control unit 306 returns to the main routine, and the control unit 306 does so in this case; for there exist two shots from the 200th to 250th frames. If otherwise, the control unit 306 repeats a loop of Step 23, Step 24, Step 25, and Step 22, reading out the combined shot and one of the remaining shots in that range from the video storage unit 301 to combine them at the video effect unit 307. The control unit 306 does not exit the loop unless the updated n has two or less.

In summary, during this sub-routine, the control unit 306 repeats the 2-shot-combining for (the total number of shots −1) times, and as a result, only two shots remain in a range of frames where there initially existed three or more shots.

Back to the main-routine, the control unit 306 stores a lastly combined shot in the above-described sub-routine into the video storage 301, and accordingly updates the shot information so that an area storing the lastly combined shot in the video storage unit 301 will be correctly stored(Step 11). In this case, the shot information in TABLE 1-2 shows that the SHOT F is the lastly combined shot in Step 10, and stored into the 5000th to 5050th frames in the video storage unit 301. Note that the SHOT A and SHOT B are respectively replaced with SHOT A1 and SHOT B1 in FIG. 6(2). This explains that the SHOT A and SHOT B do not remain intact; some frames thereof are broken with the passage of time.

Since the control unit 306 assigns the virtual channel 1 to the SHOT F, it updates the shot-reproduce information as well in Step 11. The updated shot-reproduce information is set forth in TABLE 2-2.

As has been described, the control unit 306 proceeds to Step 5 through Step 11, and when it completes the editing of a last frame specified by the shot-reproduce information, it further proceeds to Step 12. Then, the control unit 306 reads out the shot-reproduce information updated in Step 11 to assign either the existing CHANNEL 1 or CHANNEL 2 to all the shots contained in the updated shot-reproduce information. This CHANNEL assignment is critical to produce a desired combined video in Step 15; for the video effect unit 307 combines only two shots simultaneously.

Figure 9:
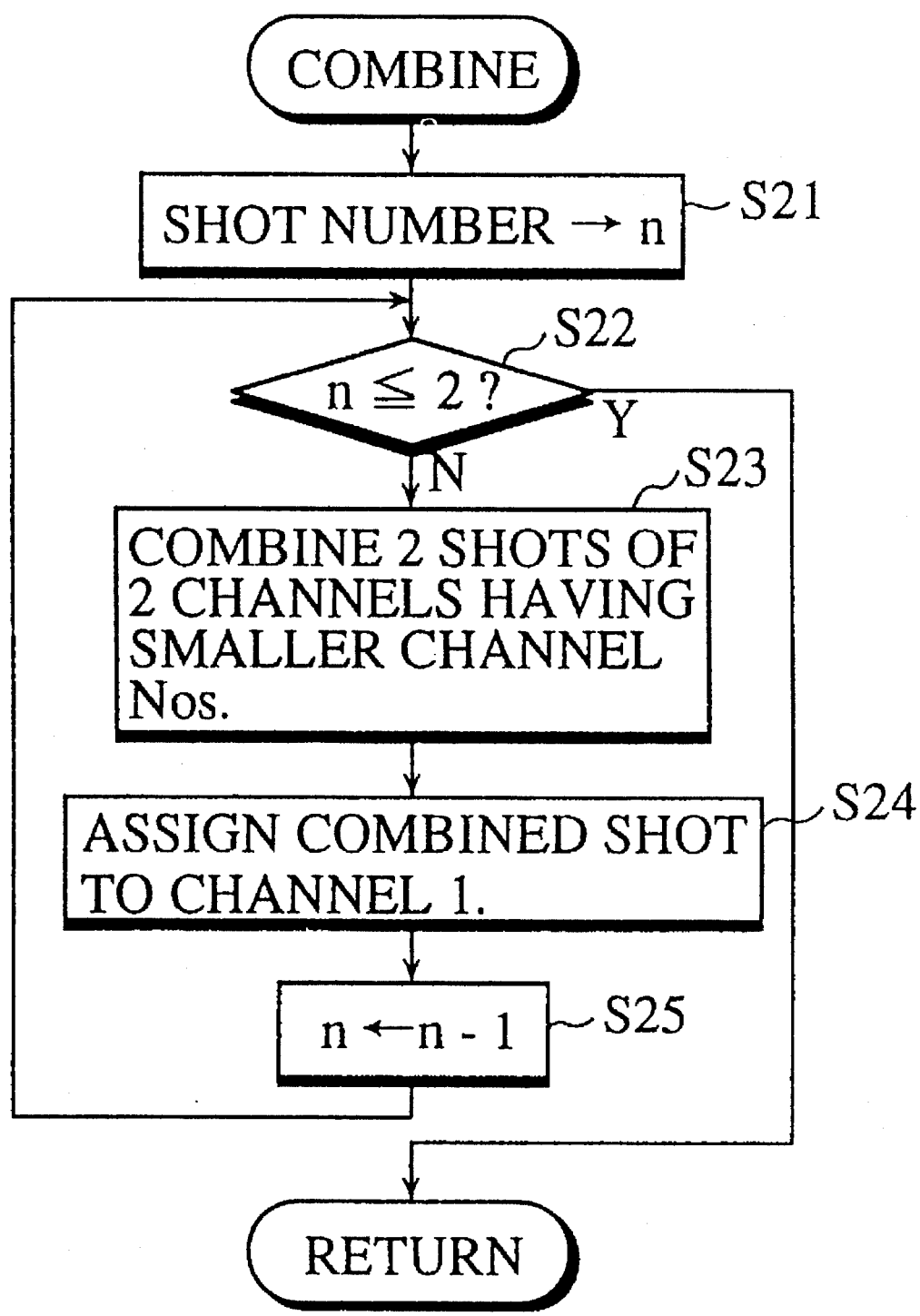
Figure 10:
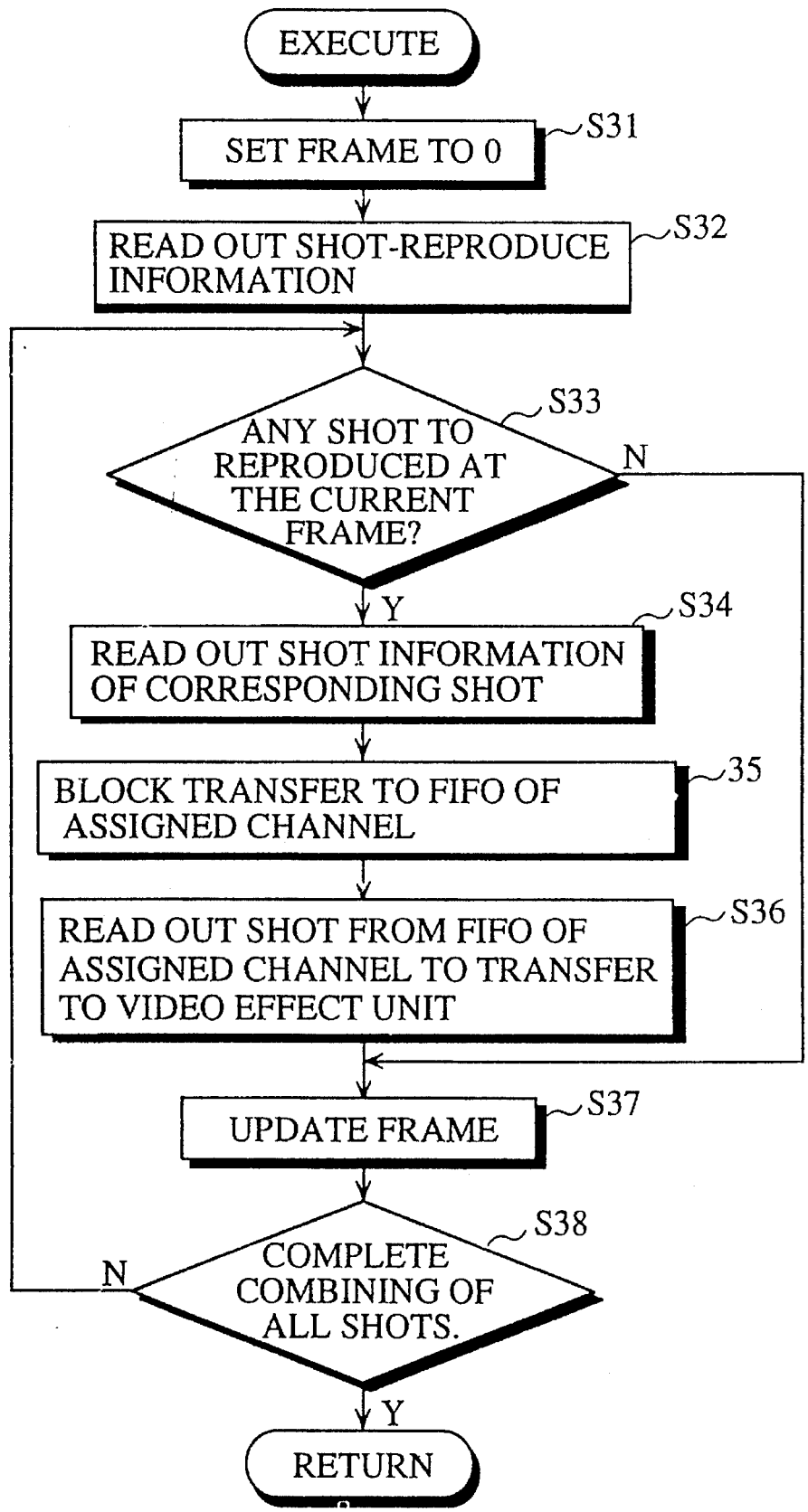

In the explanation of the sub-routine in FIG. 9, the control unit 306 operated as if there were only two shots; however, this is not relative to the fact that the system has only two CHANNELS 1, 2. For example, the shot-reproduce information in TABLE 2-2 is the one updated in Step 11, but it contains three virtual channels.

Now, a method of this CHANNEL assignment will be explained with referring to FIGS. 6(2) and 6(3).

FIG. 6(2) is a view schematically describing the shot-reproduce information in TABLE 2-3, while FIG. 6(3) describing each shot contained in the shot-reproduce information of FIG. 6(2) as a result of the CHANNEL assignment. As can be understood from FIGS. 6(2) and 6(3), the SHOT C in the virtual channel 3 is forcibly assigned to either the CHANNEL 1 and CHANNEL 2. When the SHOT C can not be assigned to a single CHANNEL like in this case, the control unit 306 subdivides the SHOT C to assigned free spaces both in the CHANNEL 1 and CHANNEL 2 to each subdivision.

The shot-reproduce information after the CHANNEL assignment is set forth in TABLE 2-3. Since the control unit 306 subdivides the SHOT C, it accordingly updates the shot information again. The updated shot information is set forth in TABLE 1-3. Thus, the control unit 306 stores the most recently updated shot information and shot-reproduce information into the shot information storage unit 302 and shot-reproduce information storage unit 305, respectively(Step 14). Having completed the steps explained thus far, the control unit 306 reads out all the shots assigned with either CHANNEL 1 or CHANNEL 2 from the video storage unit 301 with referring to the most recently updated shot information and shot-reproduce information to combined them at the video effect unit 307(Step 15), and the resulting combined shots are displayed sequentially at the display unit 308.

Step 15 is detailed by the flowchart in FIG. 10, and the explanation thereof will be given in the following.

In the first place, the control unit 306 sets the frame counter 306a to 0(Step 31), and reads out the most recently shot-reproduce information from the shot-reproduce information storage unit 305(Step 32). The control unit 306 detects whether there exists any shot to be reproduced at the 0th frame by referring to the readout shot reproduce information(Step 33). Here, the control unit 306 detects the SHOT A1 as the one to be reproduced at the 0the frame by referring to the shot-reproduce information in TABLE 2-3. Thus, the control unit 306 reads out the most recently updated shot information as to the SHOT A1 from the shot information storage unit 301(Step 34); the shot information in TABLE 1-3 shows that the SHOT A1 is stored in a range of the 100th to 199th frames in the video storage unit 301. Accordingly, the control unit 306 transfers the SHOT A1 by the block transfer to the FIFO 313 of the CHANNEL 1 specified by the shot-reproduce information(Step 35), and further to the video effect unit 307 frame by frame(Step 36); it does so by counting up the frame counter 306a one by one(Step 37). When the frame counter 306a counts up to the 150th frame, where a SHOT C1 is to be reproduced according to the shot-reproduce information(Step 33), the control unit 306 transfers the SHOT C1 by the block transfer to the FIFO 314 of the CHANNEL 2 from the corresponding area in the video storage unit 301(Step 34, step 35), and further to the video effect unit 307 frame by frame. In this way, in the range of the 150th to 199th frames, the control unit 306 reads out the SHOT A1 from the FIFO 313 and SHOT C1 from the FIFO 314, enabling the video effect unit 307 to combine the SHOT A1 and SHOT C1. The control unit 306 thereafter reads out a shot assigned with either the CHANNEL 1 or CHANNEL 2 from the video storage unit 301 for the 2-shot-combining with referring to the most recently updated shot information and shot-reproduce information by counting up the frame counter 306a one by one until the last frame number is counted up. When the frame counter 306a counts up the last frame number specified by the shot-reproduce information(Step 38), the control unit 306 returns to the main routine and ends the operation.

Consequently, all the shots are combined as desired, and the resulting combined shots are displayed sequentially at the display unit 308. FIG. 7(2) shows how the display transits in a time series.

In the drawing, P1 represents the initial display and P8 the last; P2 represents picture-in-picture of the SHOT A containing the SHOT C as the sub-shot; P3 represents a transition from P2 involving three shots, where the picture-in-picture of the SHOT A and SHOT C is gradually wiped off by the SHOT B from the bottom; P4 represents the result of the transition from P3; P5 represents a transition where the SHOT B is gradually wiped off with a SHOT D from the upper left. The explanation of P6 and P7 is omitted as it is understood from the above explanation.

FIG. 7(1) is a schematic view explaining from which frame each of the SHOTS A through E are combined in a time series.

Figure 11:
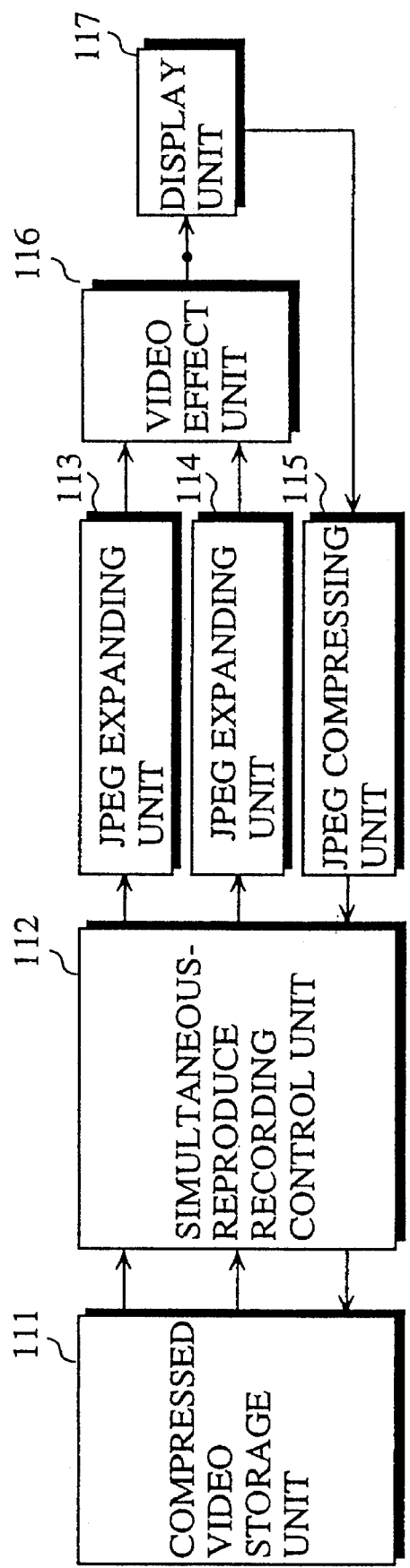
FIG. 11 is a block diagram showing another embodiment of a video editing system of the present invention.
Figure 1:
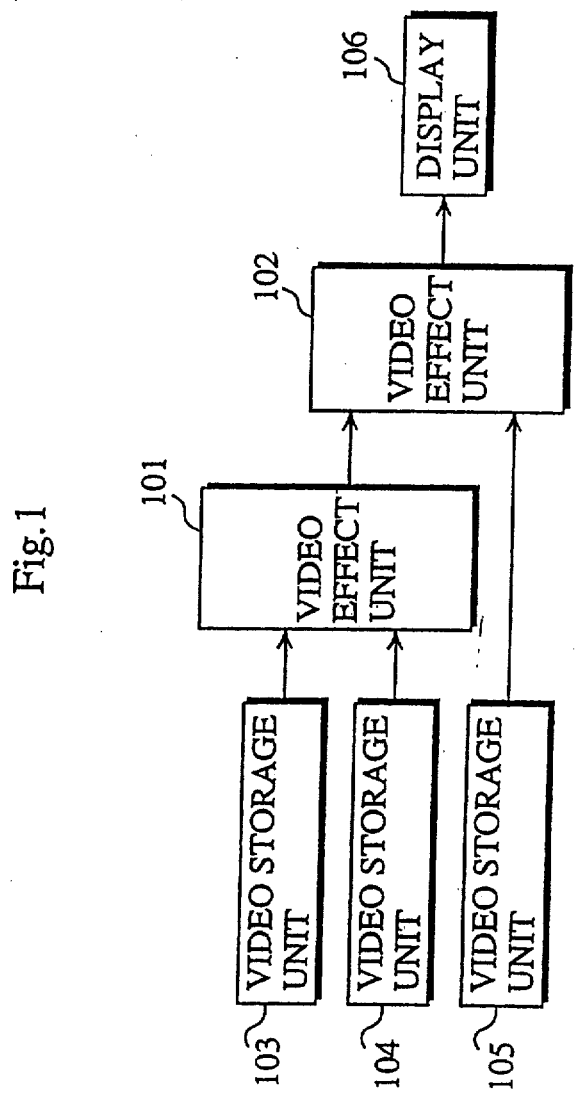

FIG. 11 is a block diagram of another embodiment of the present invention. This embodiment differs from the first one in that the video storage unit 111 stores compressed videos including both edited and non-edited; the compressed videos are read out therefrom and restored by expanding units 113, 114 to be supplied to the video effect unit 116; and the shots combined at the video effect unit 116 are compressed at the compressing unit 115 and stored into the video storage unit 111. A method called JPEG method is used herein to compress and expand the videos. This method uses an algorithm in a DCT based system disclosed in "Draft(Revision 6) of the JPEG algorithm by ISO/IEC JTC1/SC2/WG8 CCITT SGVIII. Since the other components of the video editing system and the operation thereof in accordance with this embodiment are identical with those of the first embodiment, the detailed explanation is omitted.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A video editing system comprising:

video storage means for storing a video including a plurality of shots, having a high-speed readout/writing unit with two channels capable of reading two shots simultaneously by using said two channels;

shot-reproduce information storage means for storing information as to a shot-readout sequence;

video effect means for combining two shots simultaneously;

channel assigning means for creating a plurality of virtual channels in a corresponding number to a maximum number of shots to be reproduced simultaneously by referring to said shot-reproduce information storage means to assign one of said virtual channels to each shot;

detecting means for detecting a range of frames where there exist three or more shots to be reproduced simultaneously by referring to said shot-reproduce information;

control means for reading out two shots contained in said range of frames from said video storage means simultaneously, combining said two shots at said video effect means, writing a resulting combined shot into said video storage means, and reading out said combined shot and one of remaining shots contained in said range from said video storage means to combine said combined shot with said one of remaining shots at said video effect means, the shot-combining of the combined shot and the remaining shot being repeated until the number of shots to be reproduced simultaneously has two or less;

channel changing means for imposing a lastly remaining shot without being combined and being assigned with the virtual channel into one of one and two said channels of said readout/writing unit when the number of shots for simultaneous reproduction has two or less;

shot-reproduce information updating means for updating the shot-reproduce information in said shot-reproduce information storage means each time said video effect means combines two shots into a new shot, and updating the shot-reproduce information in said shot-reproduce information storage means to obtain a last shot-reproduce information when said remaining shot is imposed onto one of one and two said channels by said channel changing means; and final-combining executing means for reading out two shots from said channels respectively after said imposition, and combining said two shots at said video effect means to output a resulting combined shot as a result of editing.

2. A video editing system of claim 1, further comprising:

shot information storage means for storing information representing a correspondence between each shot and is storage area in said video storage means, and a shot information updating unit for updating the shot information each time said control means writes a resulting combined shot into said video storage means.

3. A video editing system of claim 2, wherein said video storage means includes a high-speed hard disk having a high-speed reading/writing head, three FIFOs each having a capacity comparable to at least one shot, and switch means for selectively connecting one of said three FIFOs to said head under a control of said control means, each of two of said three FIFOs storing a shot readout from said hard disk, while the remaining FIFO storing the combined shot to be written into said hard disk.

4. A video editing system of claim 3, wherein said high-speed hard disk includes a first storage area for storing at least one non-combined shot, and a second storage area for storing at least one combined shot, and said control means writes the combined shot into said second storage area in said video storage means by means of said reading/writing unit.

5. A video editing system of claim 1, further comprising:

compressing means for compressing the combined shot from said video effect means by a certain compressing method to store a resulting compressed combined shot into said video storage means; and expanding means for expanding a compressed shot read out from said video storage means by a certain expanding method to supply a resulting shot to said video effect means.

6. A video editing system of claim 5, wherein said compressing means and said expanding means use a JPEG method as said certain compressing method and said certain expanding method, respectively.

7. A video editing system of claim 2, wherein said video storage means includes a high-speed hard disk having a high-speed reading/writing head, three FIFOs each having a capacity comparable to at least one compressed shot, and switch means for selectively connecting one of said three FIFOs to said head under a control of said control means, each of two of said three FIFOs storing a compressed shot readout from said hard disk, while the remaining FIFO storing the compressed, combined shot to be written into said hard disk.

8. A video editing system of claim 7, wherein said high-speed hard disk includes a first storage area for storing at least one compressed, non-combined shot, and a second storage area for storing at least one compressed, combined shot, and said control means writes the compressed, combined shot into said second storage area in said video storage means by means of said reading/writing unit.

9. A video editing system of claim 8, wherein said head reads out and writes a compressed shot block by block, each block including a plurality of frames, and said control means reads out compressed two shots from said two FIFOs frame by frame simultaneously and writes the combined shot into the remaining FIFO frame by frame.

10. A video editing system of claim 9, wherein said 2-shot-combining at said video effect means includes transition by wipes and dissolves, and formation of a shot contained in another shot.

11. A video editing system comprising:

video storage means for storing a video including a plurality of shots, having a readout unit capable of reading out two shots simultaneously and a writing unit for writing the combined shot produced by a video effect means into a storage area in said video storage means, said video storage means including a high-speed hard disk having a high-speed reading/writing head, three FIFOs each having a capacity comparable to at least one shot, and switch means for selectively connecting one of said three FIFOs to said head under a control of said control means, each of two of said three FIFOs storing a shot readout from said hard disk, while the remaining FIFO stores the combined shot to be written into said hard disk;

shot-reproduce information storage means for storing information as to a shot readout sequence;

shot information storage means for storing information representing a correspondence between each shot and said storage area in said video storage means;

video effect means for combining two shots simultaneously; and control means for detecting a range of frames where there exists three or more shots to be reproduced simultaneously by referring to the said shot-reproduce information storage means, and reading out two shots included in said range from said video storage means to combine said two shots at said video effect means, storing a resulting combined shot into said video storage means, reading out said combined shot in one of remaining shots in said range from said video storage means, combining said combined shot in said one of remaining shots at said video effect means, said shot combining of the combined shot and the remaining shot being repeated until there exists a single resulting combined shot in said range, said control means using said writing unit to write the combined shot into said storage area in said video storage means, said control means including a shot information updating unit for updating the shot information each time said control means writes a combined shot into said video storage means by means of said writing means.

12. A video editing system of claim 11, wherein said high-speed hard disk includes a first storage area for storing at least one non-combined shot, and a second storage area for storing at least one combined shot, and said control means writes the combined shot into said second storage area in said video storage means by means of said writing unit.

13. A video editing system of claim 12, wherein said head reads out and writes a shot block by block, each block including a plurality of frames, and said control means reads out two shots from said two FIFOs frame by frame simultaneously and writes the combined shot into the remaining FIFO frame by frame.

14. A video editing system of claim 13, wherein said 2shot-combining at said video effect means includes transition by wipes and dissolves, and formation of a shot contained in another shot.

15. A video editing system comprising:

video storage means for storing a video including a plurality of shots, having a readout unit capable of reading out two shots simultaneously, said video storage means including a writing unit for writing the compressed, combined shot by a video effect means into a storage area in said video storage means, said video storage means including a high-speed hard disk having a high-speed reading/writing head, three FIFOs each having a capacity comparable to at least one compressed shot, and switch means for selectively connecting one of said three FIFOs to said head under a control of said control means, each of two of said three FIFOs storing a compressed shot readout from said hard disk, while the remaining FIFO stores the compressed, combined shot to be written into said hard disk;

shot-reproduce information storage means for storing information as to a shot readout sequence;

shot information storage means for storing information representing a correspondence between each compressed shot and said storage area in said video storage means;

video effect means for combining two shots simultaneously;

compressing means for compressing the combined shot from said video effect means by use of a JPEG compressing method to store a resulting compressed, combined shot into said video storage means;

expanding means for expanding a compressed shot read out from said video storage means by a JPEG expanding method to supply resulting shot to said video effect means; and control means for detecting a range of frames where there exists three or more shots to be reproduced simultaneously by referring to said shot-reproduce information storage means, and reading out two shots included in said range from said video storage means to combine said two shots at said video effect means, storing a resulting combined shot into said video storage means, reading out said combined shot and one of remaining shots in said range from said video storage unit, combining said combining shot and said one of remaining shots at said video effect means, said shot combining of a combined shot and the remaining shot being repeated until there exists a single resulting combined shot in said range, said control means using said writing unit to write the compressed, combined shot into said storage area into said video storage means, said control means including a shot information updating unit for updating the shot information each time said control means writes a compressed, combined shot into said video storage means by means of said writing means.

16. A video editing system of claim 15, wherein said high-speed hard disk includes a first storage area for storing at least one compressed, non-combined shot, and a second storage area for storing at least one compressed, combined shot, and said control means writes the compressed, combined shot into said second storage area in said video storage means by means of said writing unit.

17. A video editing system of claim 16, wherein said head reads out and writes a compressed shot block by block, each block including a plurality of frames, and said control means reads out two compressed shots from said two FIFOs frame by frame simultaneously and writes the combined shot into the remaining FIFO frame by frame.

18. A video editing system of claim 17, wherein said 2-shot-combining at said video effect means includes transition by wipes and dissolves, and formation of a shot contained in another shot.

19. A video editing system comprising:

video storage means for storing a video including a plurality of shots having a readout unit capable of reading out two shots simultaneously and including a writing unit for writing the combined shot produced by said video effect means into a storage area in said video storage means, said video storage means further including a high-speed hard disk having a high-speed reading/writing head, three FIFOs each having a capacity comparable to at least one shot and switch means for selectively connecting one of said three FIFOs to said head under control of said control means, each two of said three FIFOs storing a shot readout from said hard disk while the remaining FIFO stores the combined shot to be written into said hard disk;

shot-reproduce information storage means for storing information as to a shot readout sequence;

shot information storage means for storing information representing a correspondence between each shot and said storage area in said video storage means;

video effect means for combining two shots simultaneously; and control means for detecting a range of frames where there exists three or more shots to be reproduced simultaneously by referring to said shot-reproduce information storage means and reading out two shots included in said range from said video storage means to combine said two shots at said video effect means, storing a resulting combined shot into said video storage means, reading out said combined shot and one of remaining shots in said range from said video storage means, combining said combined shot and said one of remaining shots at said video effect means, said shot combining of the combined shot and the remaining shot being repeated until there exists a single resulting combined shot in said range, said control means using said writing unit to write the combined shot into said storage area in said video storage means, said control means including a shot-reproduce information updating unit for updating the shot-reproduce information each time said video effect means combines two shots, and a shot information updating unit for updating the shot information each time said control means writes a combined shot into said video storage means by means of said writing means.

20. A video editing system of claim 19, wherein said high-speed hard disk includes a first storage area for storing at least one non-combined shot, and a second storage area for storing at least one combined shot, and said control means writes the combined shot into said second storage area in said video storage means by means of said writing unit.

21. A video editing system of claim 20, wherein said head reads out and writes a shot block by block, each block including a plurality of frames, and said control means reads out two shots from said two FIFOs frame by frame simultaneously and writes the combined shot into the remaining FIFO frame by frame.

22. A video editing system of claim 21, wherein said 2-shot-combining at said video effect means includes transition by wipes and dissolves, and formation of a shot contained in another shot.

23. A video editing system comprising:

video storage means for storing a video including a plurality of shots, having a readout unit capable of reading out two shots simultaneously, said video storage means including a writing unit for writing a compressed, combined shot produced by a video effect means into a storage area into said video storage means, said video storage means including a high-speed hard disk having a high-speed reading/writing head, three FIFOs each having a capacity comparable to at least one compressed shot, and switch means for selectively connecting one of said three FIFOs to said head under control of said control means, each of two of said three FIFOs storing a compressed shot readout from said hard disk, while the remaining FIFO stores the compressed, combined shot to be written into said hard disk;

shot-reproduce information storage means for storing information as to a shot readout sequence;

shot information storage means for storing information representing a correspondence between each compressed shot and said storage area in said video storage means;

video effect means for combining two shots simultaneously;

compressing means for compressing the combined shot from said video effect means by a JPEG compressing method to store a resulting compressed, combined shot into said video storage means;

expanding means for expanding a compressed shot read out from said video storage means by a JPEG expanding method to supply resulting shot to said video effect means; and control means for detecting a range of frames where there exists three or more shots to be reproduced simultaneously by referring to said shot-reproduce information storage means, and reading out two shots included in said range from said video storage means to combine said two shots and said video effect means, storing a resulting combined shot into said video storage means, reading out said combined shot in one of remaining shots in said range from said video storage unit, combining said combined shot in said one of remaining shots at said video effect means, said shot combining of the combined shot and the remaining shot being repeated until there exists a single resulting combined shot in said range, said control means including a shot-reproduce information updating unit for updating the shot-reproduce information each time said video effect means combines two shots, said control means using said writing unit to write the compressed, combined shot into said storage area in said video storage means, said control means including a shot information updating unit for updating the shot information each time said control means writes a compressed, combined shot into said video storage means by means of said writing means.

24. A video editing system of claim 23, wherein said high-speed hard disk includes a first storage area for storing at least one compressed non-combined shot, and a second storage area for storing at least one compressed combined shot, and said control means writes the compressed, combined shot into said second storage area in said video storage means by means of said writing unit.

25. A video editing system of claim 24, wherein said head reads out and writes a compressed shot block by block, each block including a plurality of frames, and said control means reads out two compressed shots from said two FIFOs frame by frame simultaneously and writes the compressed, combined shot into the remaining FIFO frame by frame.

26. A video editing system of claim 25, wherein said 2-shot-combining at said video effect means includes transition by wipes and dissolves, and formation of a shot contained in another shot.

* * * * *

UNITED STATES PATENT AND TRADEMARK OFFICE
CERTIFICATE OF CORRECTION

PATENT : 5,526,132

DATED : June 11, 1996

INVENTOR(S) : Rumi Tsubota et al.

It is certified that error appears in the above-identified patent and that said Letters Patent is hereby corrected as shown below:

On the title page, after the last line of the ABSTRACT, "12 Drawing Sheets" and insert therefor --11 Drawing Sheets--.

Figure 1:
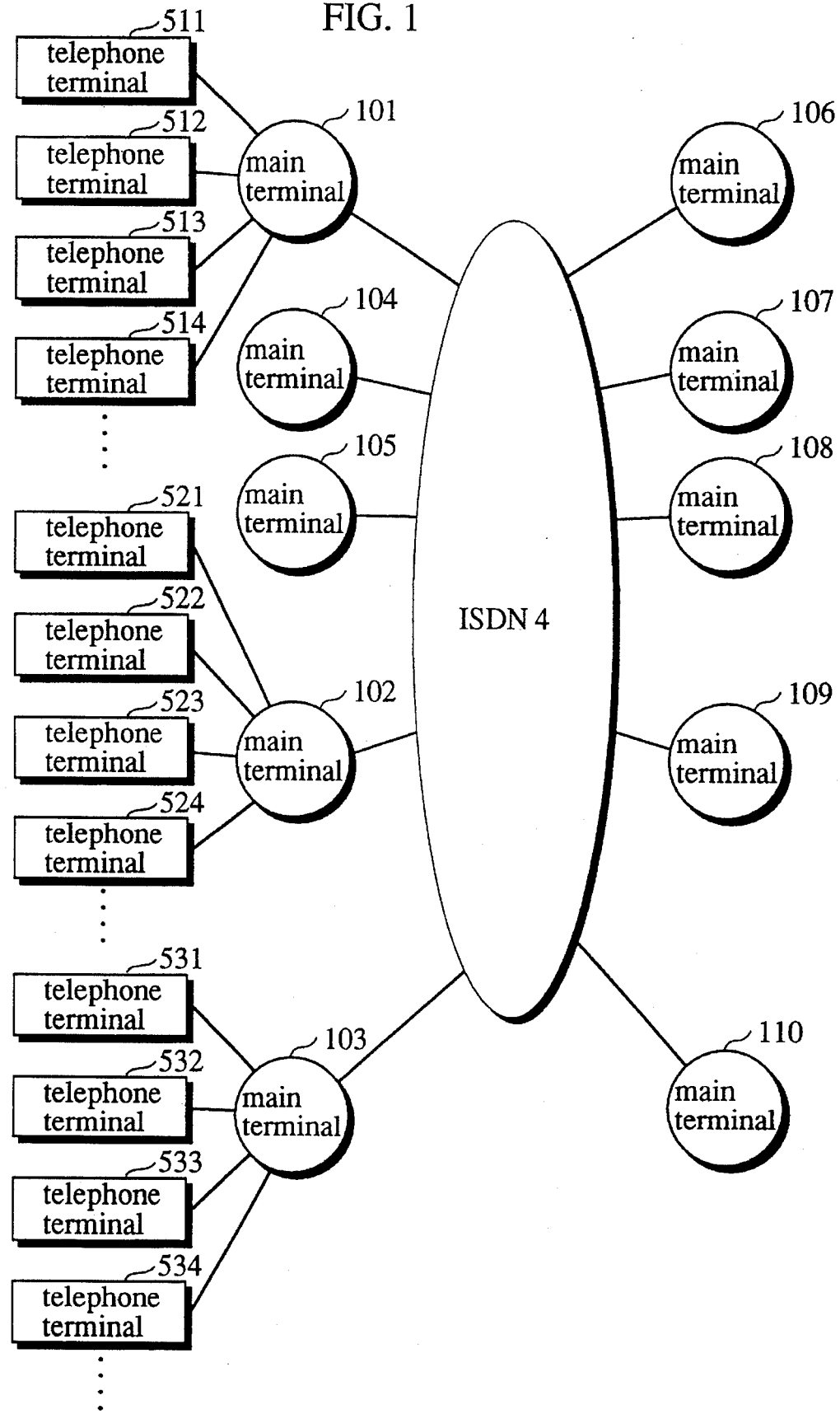
FIG.1 is a block diagram showing a conventional video editing system.
Figure 2A:
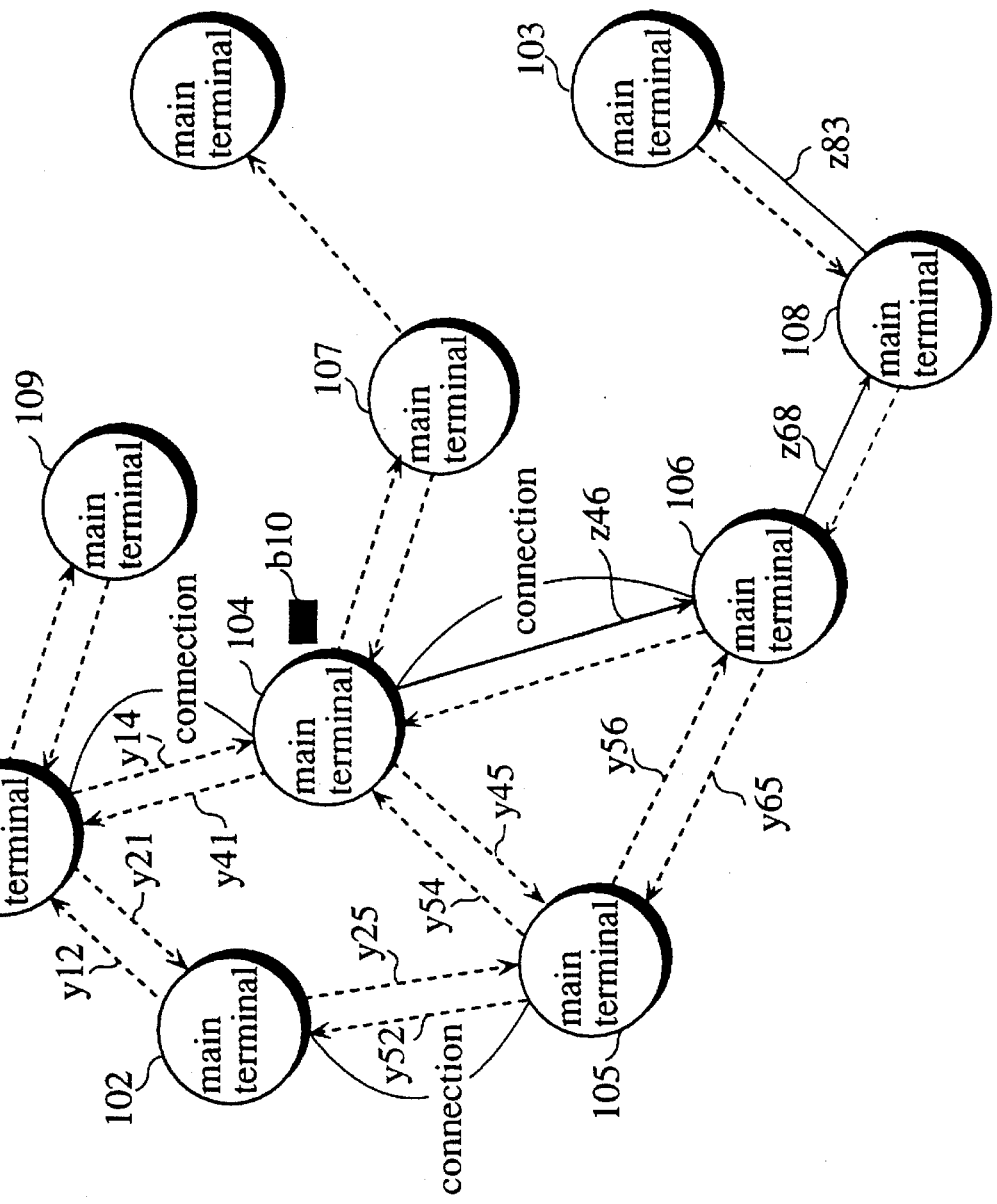

In the Drawings:
  Delete Fig. 1 of the patent and replace Fig. 1 with the attached Fig. 1.
  Delete FIG.2A.

Drawing Sheets 1-12 should be renumbered as Sheets 1-11.

Signed and Sealed this

Nineteenth Day of September, 2000

*Attest:*

Q. TODD DICKINSON

*Attesting Officer*  *Director of Patents and Trademarks*